US006854913B2

(12) United States Patent
Farrell et al.

(10) Patent No.: US 6,854,913 B2
(45) Date of Patent: Feb. 15, 2005

(54) MAGNETIC WRITING APPARATUS

(76) Inventors: John F. Farrell, 2720 Homes Dr., Morehead City, NC (US) 28557; Henry B. Hoffman, 1300 Park West Blvd., Unit 301, Mount Pleasant, SC (US) 29466

( * ) Notice: Subject to any disclaimer, the term of this patent is extended or adjusted under 35 U.S.C. 154(b) by 0 days.

(21) Appl. No.: 10/389,147

(22) Filed: Mar. 15, 2003

(65) Prior Publication Data

US 2003/0228185 A1 Dec. 11, 2003

Related U.S. Application Data

(60) Provisional application No. 60/364,383, filed on Mar. 16, 2002.

(51) Int. Cl.[7] ......................... B43K 29/00; A46B 11/00; G09B 21/00

(52) U.S. Cl. .......................... 401/195; 401/48; 434/112

(58) Field of Search ................................ 434/112, 117; 401/48, 52, 131, 195

(56) References Cited

U.S. PATENT DOCUMENTS

| | | | | | |
|---|---|---|---|---|---|
| 4,173,021 | A | * | 10/1979 | Zuchner et al. | 346/140.1 |
| 4,865,285 | A | * | 9/1989 | Gaggianese | 248/309.4 |
| 5,263,593 | A | * | 11/1993 | Aida | 211/69.1 |
| 5,505,553 | A | * | 4/1996 | Saviano et al. | 401/117 |
| 5,599,123 | A | * | 2/1997 | Still | 401/52 |
| 6,033,139 | A | * | 3/2000 | Dutcher | 401/35 |

* cited by examiner

*Primary Examiner*—David J. Walczak
(74) *Attorney, Agent, or Firm*—MacCord Mason PLLC

(57) ABSTRACT

A magnetic writing instrument designed to allow people with hand tremors to write and draw with increased clarity. Consisting of a stylus attached to a base at an appropriate writing angle. The base houses a magnet and accommodates three caps of varying thickness to match the resistance needed with the users tremors. There is also a metal writing base that interacts with the magnet. The paper or writing stationary is placed between the metal writing base and the writing instrument.

7 Claims, 3 Drawing Sheets

FIG. II
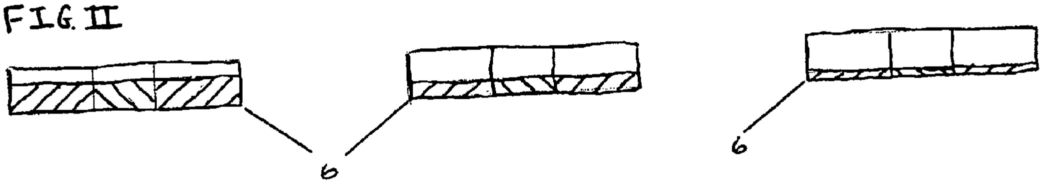
FIG. III
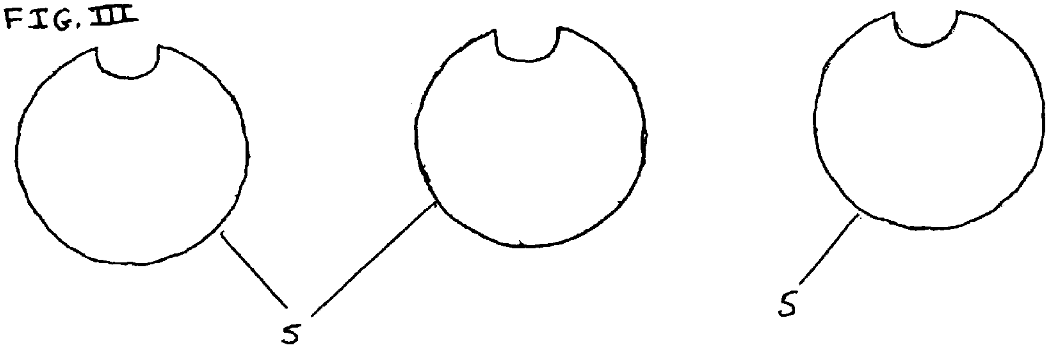

FIG IV.
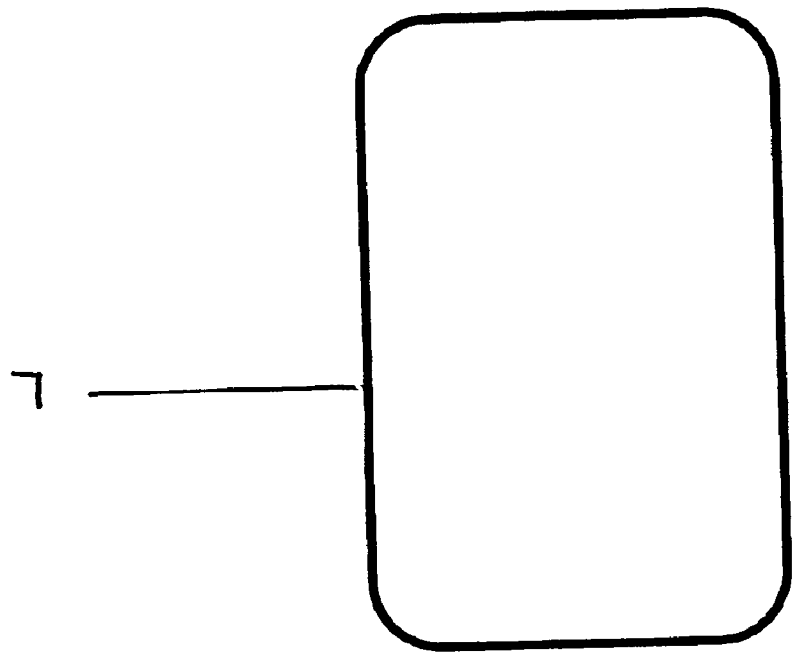

MAGNETIC WRITING APPARATUS

This application claims the benefits of U.S. Provisional application Ser. No. 60/364,383 filed Mar. 16, 2002.

BACKGROUND OF THE INVENTION

1. Field of the Invention

The present invention relates to a magnetic writing apparatus, in particular, the invention is well suited for maximizing clarity and control while writing and drawing, for individuals suffering from hand tremors secondary to a neurological condition.

2. Description of the Prior Art

Writing aids and instruments designed to improve penmanship usually address ergonomic or adaptive grips and writing angles. U.S. Pat. Nos. 2,498,105 and 1,416,564 offer writing instruments that focus on maintaining a specific writing angle with respect to the stationary or writing surface.

U.S. Pat. No. 5,505,553 Saviano et al. offer a writing aid that would assist the writer in maintaining the proper pressure between the writing instrument tip and the surface upon which he or she is writing. It accomplishes this by using a two-part sleeve that wraps around the pen or pencil and has a magnetic component that offers a type of feedback if the user is pushing down to hard.

Other products on the market that address tremors use a verity of designs in an attempt to stabilize the tremors. Some use weights that are added to the writing instrument, or a weighted device that attaches around the pen, pencil, or writing utensil. Another uses a magnet with a Velcro strap that is attached circumferentially around the users wrist, said device also offers three plastic caps of the same thickness but are larger in circumference which the magnet rests in so they can be stacked to decrease resistance. The three caps are not sized to fit securely within each other and slide around inside one another complicating the writing process. The wrist magnet also interacts with a metal writing surface, however does not control the tremors below the wrist.

Although both above mentioned ideas are unique in their design they do not offer the resistance at the distal most point, the tip of the pen, pencil, or writing utensil. It is the intent of this invention to provide a better alternative than the currently available writing aids for people suffering with hand tremors.

SUMMARY OF THE INVENTION

A magnetic writing instrument designed to assist people suffering from hand tremors to be able to write or draw with increased clarity. It consists of a stylus attached to a round base at an appropriate writing angle. The stylus has a longitudinal groove that allows the writing utensil to be positioned securely. In the base, a magnet is attached. There are three buffer caps, numbered from 1–3, of varying thickness that can be attached to the base of the stylus covering the magnet. Each cap is progressively thinner therefore, offering the ability to adjust the amount of resistance between the magnet and the metal writing surface.

Once the person using the magnetic writing instrument has determined which cap is appropriate for his or her tremors, he or she places a piece of stationary on the metal base. The individual then positions the pen or pencil onto the stylus and begins writing or drawing. To further fine-tune the match between resistance and tremors the person is instructed to add or subtract additional pieces of stationary.

BRIEF DESCRIPTION OF THE DRAWINGS

FIG. 2 is a side view of the three buffer caps.

FIG. 3 is a top view of the three buffer caps.

FIG. 4 is a top view of the metal base.

DETAILED DESCRIPTION OF THE INVENTION

Figure 1:
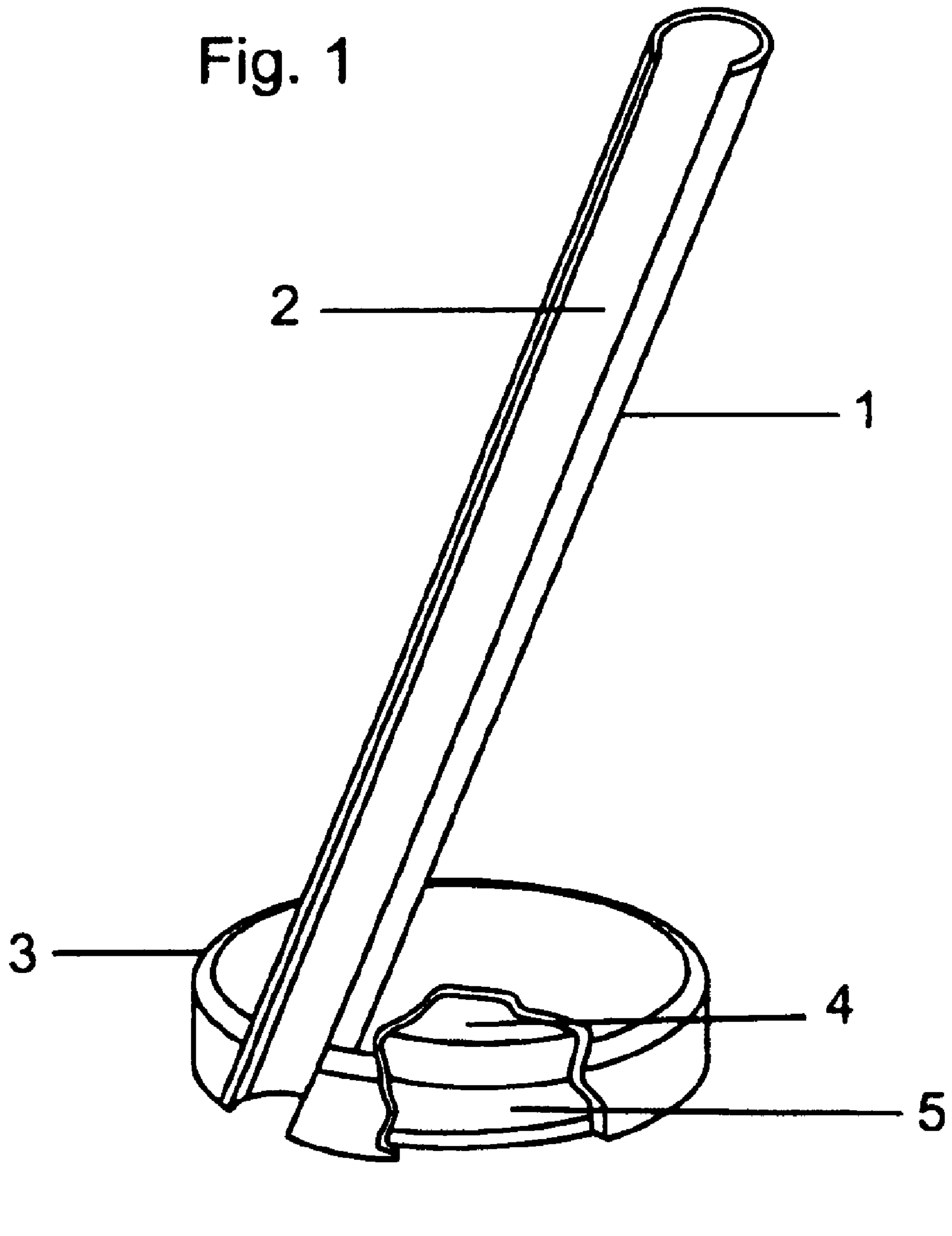
FIG. 1 is a perspective view of the base and stylus, with a cut-away section to show the magnet and buffer cap within the interior of the stylus.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

This invention relates to the magnetic writing instrument for individuals suffering with hand tremors. The stylus 1, is round on one side with a longitudinal groove 2, down the other side the entire length of the stylus, the bottom of the stylus is cut at an appropriate writing angle. The stylus 1, is generally made of plastic, and is attached to the round base 3, at the bottom.

The round base 3, is flat with a rounded circumferential edge on top, and a groove where the stylus is attached at the appropriate writing angle along the outside border. The bottom of the base has a hollow space where the magnet 4, is attached. There is a slight groove around the outside edge to help secure the buffer caps. Additionally, a corresponding raised lip on the inside edge of the buffer caps 5 act as a locking mechanism with the groove on the outside edge of the base. The base is generally made out of plastic. The magnet has a metal housing on the top side that helps direct the magnetic force down in one direction. The magnet is attached to the bottom of the round base. The magnet sits flush and level within the round base for a correct fit with the caps. The metal housing side of the magnet is glued to the round base focusing the magnetic force down towards the metal writing surface 7.

The three buffer caps are generally made of plastic. The caps are round and have a raised lip on the inside edge that interacts with the raised lip on the outside edge of the base so they can be securely locked in during writing or drawing. The three buffer caps 5 have the same dimensions with the exception of the bottom. The said bottoms are of different thickness 6 to offer varying amounts of resistance of the magnetic force. The three buffer caps are numbered 1, 2, 3, on the inside surface to facilitate ease of selection by the user.

There is a thin metal writing base 7 that the stationary or paper rests on during writing or drawing. This metal writing base interacts with the magnet housed in the bottom of the base section. This invention differs from all the prior art as it does not use weights, and the magnetic force is put at the distal most point of the writing utensil. In addition, the three buffer caps are interchangeable and lock securely to the base section that the stylus is attached to.

What is claimed is:

1. A magnetic writing instrument that offers varying degrees of magnetic resistance to match the amount of hand tremors, for increased writing and drawing clarity comprising:

a) stylus section and base section connected to said stylus section;

b) a magnet that is connected to the base section;

c) a plurality of caps wherein a selected cap is attached to the base section; and d) a metal base that interacts with the magnet connected to the base section.

2. The magnetic writing instrument of claim 1, wherein said stylus section is round in shape with a longitudinal groove down one side to accommodate most writing utensils.

3. The magnetic writing instrument of claim 2, wherein said stylus is cut at the bottom end at an appropriate writing angle.

4. The magnetic writing instrument of claim 1, wherein said base section is round with a groove where the stylus is attached.

5. The magnetic writing instrument of claim 4, wherein said base has a bottom surface and said magnet is connected to said bottom surface.

6. The magnetic writing instrument of claim 1, wherein said plurality of caps have varying thicknesses, whereby the amount of resistance generated between the magnet and the metal base is altered dependent on the cap selected.

7. The magnetic writing instrument of claim 1, wherein said metal base is rectangular in shape.

* * * * *